US008671274B2

(12) United States Patent  
Ross et al.

(10) Patent No.: US 8,671,274 B2  
(45) Date of Patent: Mar. 11, 2014

(54) DELIVERY OF MULTIPLE THIRD-PARTY SERVICES TO NETWORKED DEVICES

(75) Inventors: Mark Andrew Ross, San Carlos, CA (US); Timothy Bucher, Geyserville, CA (US)

(73) Assignee: Dell Products L.P., Round Rock, TX (US)

( * ) Notice: Subject to any disclaimer, the term of this patent is extended or adjusted under 35 U.S.C. 154(b) by 1029 days.

(21) Appl. No.: 12/259,876

(22) Filed: Oct. 28, 2008

(65) Prior Publication Data

US 2010/0106965 A1   Apr. 29, 2010

(51) Int. Cl.
*H04L 29/06* (2006.01)

(52) U.S. Cl.
USPC ............ 713/159; 713/156; 713/157; 713/158; 726/27; 726/28; 726/29; 726/30

(58) Field of Classification Search
USPC .......................................................... 713/159
See application file for complete search history.

(56) References Cited

U.S. PATENT DOCUMENTS

| | | | |
|---|---|---|---|
| 2005/0044016 | A1 | 2/2005 | Irwin et al. |
| 2005/0081029 | A1* | 4/2005 | Thornton et al. ............. 713/156 |
| 2007/0086431 | A1 | 4/2007 | Abu-Amara |
| 2007/0155307 | A1 | 7/2007 | Ng et al. |
| 2007/0161402 | A1 | 7/2007 | Ng et al. |
| 2008/0082421 | A1 | 4/2008 | Onyon et al. |
| 2009/0037008 | A1 | 2/2009 | Moorer et al. |
| 2009/0044016 | A1 | 2/2009 | Vauclair |
| 2009/0063314 | A1 | 3/2009 | Wang et al. |
| 2009/0150406 | A1 | 6/2009 | Giblin |
| 2009/0216621 | A1 | 8/2009 | Anderson et al. |
| 2009/0327059 | A1 | 12/2009 | Grigorovitch |
| 2010/0005483 | A1* | 1/2010 | Rao .................................. 725/25 |
| 2010/0036759 | A1 | 2/2010 | Ben-Yaacov et al. |
| 2010/0076873 | A1 | 3/2010 | Taylor et al. |

FOREIGN PATENT DOCUMENTS

WO         WO 99/15947         *  4/1999

OTHER PUBLICATIONS

U.S. Appl. No. 12/259,471, filed Oct. 28, 2008, Ross et al.
U.S. Appl. No. 12/259,471, Jun. 22, 2010, Office Action.
U.S. Appl. No. 12/259,471, Nov. 9, 2010, Final Office Action.
U.S. Appl. No. 12/259,471, Feb. 1, 2011, Office Action.
U.S. Appl. No. 12/259,471, Aug. 4, 2011, Final Office Action.
Notice of Allowance from U.S. Appl. No. 12/259,471 mailed Dec. 28, 2011.

* cited by examiner

*Primary Examiner* — Longbit Chai
(74) *Attorney, Agent, or Firm* — Brian Tucker; Kirton McConkie

(57) ABSTRACT

Systems and methods for authenticating a media device or other information handling system so as to be able to receive content from one or more media content providers. Authenticating the device includes determining what authentication information the media content providers require for access and then to generating and providing to the media device an authentication token that includes the required information. In some embodiments this may be accomplished by a service center, which removes the need for additional authentication steps to be performed by the media device or the media content providers. In addition, the service center may also determine when changes are made to the authentication information and may then ensure that the authentication token is changed or updated to reflect these changes. This ensures that the media device is at least partially immune to changes to authentication.

18 Claims, 5 Drawing Sheets

DELIVERY OF MULTIPLE THIRD-PARTY SERVICES TO NETWORKED DEVICES

CROSS-REFERENCE TO RELATED APPLICATIONS

Not applicable.

BACKGROUND

1. The Field of the Invention

The present invention relates generally to portable media devices. More specifically, embodiments of the present invention relate to methods and systems for interfacing portable media devices with media content providers.

2. The Relevant Technology

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One of the advantages afforded by technological improvements is the ability to distribute to digital media. However, the ability of information handling systems to distribute digital media has not kept pace with the ways in which digital media can be distributed, the wide variety of digital media, or with the growing diversity among media devices.

For example, digital media (e.g., music, video, Internet data, sports data, news data, weather data, etc.) can be distributed to media devices via various networks including the Internet as well as wireless communication, such as satellite radio, WiFi, cellular networks, and the like. Given the diversity of media devices and media content, many different types of devices have been developed to enjoy the growing availability of digital media, including MP3 players, portable CD players, portable DVD players, notebook computers, cellular telephones, personal digital assistants (PDAs), are examples of such devices. Digital media can also be enjoyed on other non-portable devices as well such as on desk top computers.

Oftentimes, the media content providers require user authentication before they will provide any content or services to portable and non-portable media devices. Consequently, the portable and non-portable media devices must contact each individual media content provider that requires authentication and satisfy any authentication requirements prior to being able to access desired content or services. This is often time consuming and undesirable.

In addition, the authentication requirements of one or more media service providers may be periodically changed or updated. This often means that a portable and non-portable media device that was previously authenticated to receive content or services will no longer be authenticated without going through the time consuming authentication process.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment disclosed herein relates to a method for providing authentication to a media device so that the media device may receive content or services from one or more media content providers. The method may be practiced in a system including a media device that receives content or services from one or more media content providers. The method comprises receiving a request from a media device for content or services provided by a selected media content provider, determining authentication information that is required by the selected media content provider in order for the media device to communicate with the selected media content provider, generating an authentication token based on the authentication information, and providing the authentication token to the media device, wherein the authentication token is configured to allow the media device to receive the content or services directly from the selected media provider without the need for additional authentication from the selected media content provider.

Another embodiment disclosed herein relates to a method for a media device to receive authentication for access to content or services from the one or more media content providers. The may be practiced in a system including a media device that receives content or services from one or more media content providers. The method comprises requesting content or services provided by a particular media content provider from an external service center, receiving an authentication token for the particular media content provider from the external service center, the authentication token authenticating access to the content or services provided by the particular media content provider without the need for additional authentication from the particular media content provider, and requesting access to the content or services from the particular media content provider. In some embodiments, the method may also include receiving content or services from the media content provider.

An additional embodiment disclosed herein relates to a service center for providing authentication between one or more media devices and one or more media content providers. The service center comprises a processor, one or more transceivers for transferring data between the service center and the one or more media devices and between the service center and the one or more media content providers, one or more memory modules for storing information required to authenticate the one or more media devices to receive content or services from the one or more media content providers, and an authentication module configured to generate one or more authentication tokens based on the information required to authenticate the one or more media devices and configured to provide the one or more authentication tokens to the one or more media devices, the one or more authentication tokens configured to authenticate the one or more media devices to receive to receive the content or services from the one or more media content providers without additional authentication steps by the one or more media devices and the one or more media content providers.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

In the following detailed description, reference is made to the accompanying drawings which form a part hereof, and in which are shown by way of illustration specific embodiments in which the invention may be practiced. It is to be understood that other embodiments may be utilized and structural changes may be made without departing from the scope of the present invention For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Embodiments of the invention relate to systems and methods for authenticating a media device or other information handling system so as to be able to receive content from one or more media content providers. Authenticating the device includes determining what authentication information the media content providers require for access and then to generating and providing to the media device an authentication token that includes the required information. In some embodiments this may be accomplished by a service center. Advantageously, the service center removes the need for additional authentication steps to be performed by the media device or the media content providers.

In addition, the service center may also determine when changes are made to the authentication information and may then ensure that the authentication token is changed or updated to reflect these changes. Advantageously, this ensures that the media device is at least partially immune to changes to authentication.

Figure 1:
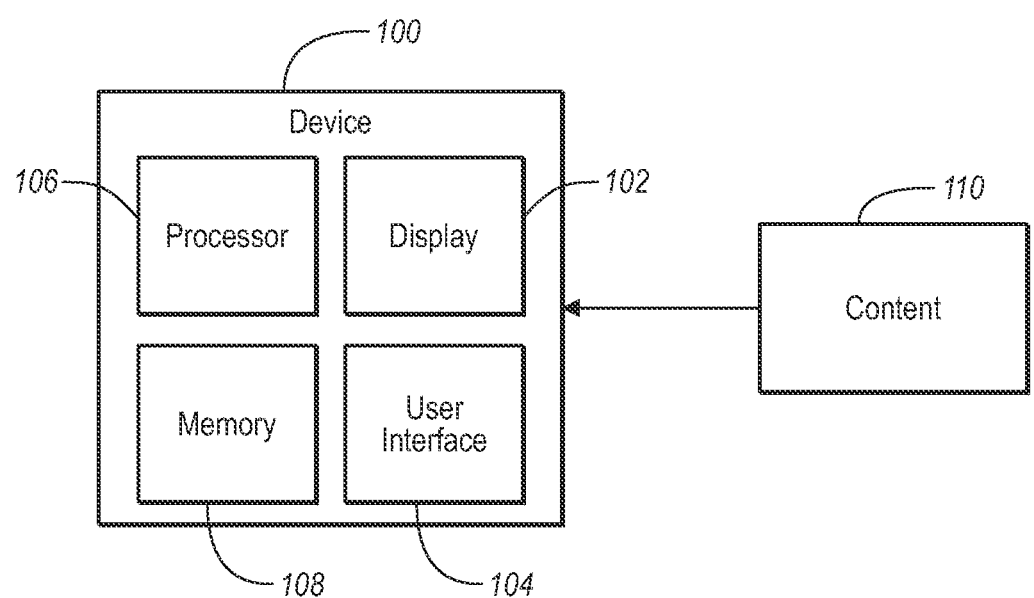
FIG. 1 illustrates a schematic drawing of a portable media device.

FIG. 1 illustrates an embodiment of a media device that can receive content including digital media from one or more sources. Examples of the media device 100 may include, by way of example, a satellite radio device, a portable audio player (such as a MP3 player or iPod), a portable DVD or CD player, a personal computer, a laptop computer, a server computer, a cellular telephone, a personal digital assistant (PDA), and the like or any combination thereof Embodiments of the invention generally refer to media devices, but one of skill in the art can appreciate that embodiments of the invention can be used with other types of information handling systems able to receive and render media content.

Typically, the media device 100 includes a display 102 that can convey information to the user of the media device. For example, when the media device 100 renders digital audio data, the display 102 may indicate the song title, the artist, the album title, the track number, the length of the track, and the like or any combination thereof. The media device 100 also includes a user interface 104 (such as control buttons, touch screen, capacitive input, etc.) or other means of providing input to the media device 100. The user interface 104, by way of example, enables a user to navigate and activate the digital media and other content that is stored on the memory 108 of the media device 100 or to navigate and perform any digital media or content that is received from an external source. The user interface 104 may enable a user to switch to another channel, such as in satellite radio, or otherwise select media content.

The media device 100 may further include a processor 106. The processor 106 by way of example, enables media device 100 to execute various programs as circumstances warrant. In addition, the processor 106 may be utilized by one or more of the other modules or elements of media device 100 for processing operations.

The memory 108 of the media device, which may include volatile and non-volatile memory or any combination thereof, can be used to store content or other user and/or media device data. The memory 108, for example, may store digital music and/or video, graphics, play lists, user preferences, device settings, and the like or any combination thereof.

The content 110 represents different types of media including digital media that may be received by the media device 100. Examples of the content 110 include, but are not limited to, digital music, talk audio data, television data, movie data, podcasts, sports data, weather data, news data, Internet data, and the like or any combination thereof. The content 110 can be either digital or analog in nature. The content 110 is received by one or more receive and transmit interfaces of the media device that are configured for receiving and transmitting digital media.

Figure 2:
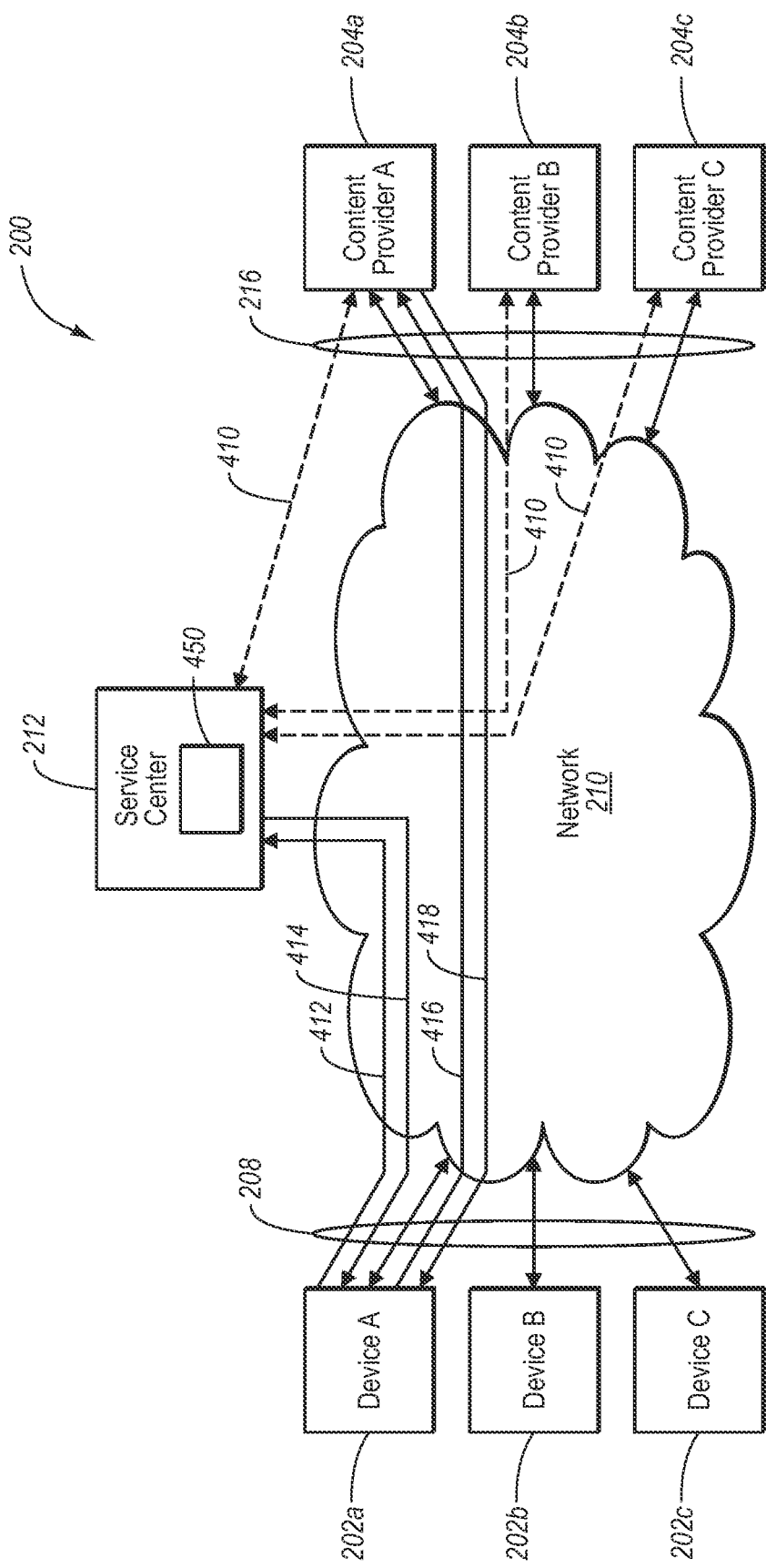
FIG. 2 illustrates a system including a service center configured to authenticate one or more media devices to receive content from one or more media content providers.

FIG. 2 illustrates one example of an environment for implementing embodiments of the invention. FIG. 2 includes a system 200 for enabling multiple media devices 202a, 202b and 202c to receive one or more services from multiple media content providers 204a, 204b and 204c. The system 200 also includes a service center 212, which may be executing on server computer(s), for interfacing between the media devices 202 and the media content providers 204. The service center 212 may communicate with the media devices 202 directly, or through a network 210, as illustrated in FIG. 2. Likewise, the service 212 may communicate with the media content providers 204 directly, or through the network 210, as further illustrated in FIG. 2. It will be appreciated that the number of media devices 202 and content providers 204 shown in FIG. 2 is for illustration only. In other words, there is no correlation between the number of media devices and service providers as embodiments disclosed herein contemplate that there may be more or less than three media devices 202 and more or less than three service providers 204.

The media devices 202 may include, for example, any of the media devices described in reference to FIG. 1. The media content providers 204 may be representative of media sources providing digital media that may be received by the media devices 202. The media content providers 204 may be sources through which a user may obtain music, Internet data, video, podcasts, text data, and the like or any combination thereof. Exemplary media content providers 204 may include, by way of example, satellite sources including digital radio and video, terrestrial sources, internet service providers, music downloads services, peer to peer networks, and the like or any combination thereof. The media content providers 204 may include free services that may be accessed free of charge. Alternatively, the media content providers 204 may include pay services that may only be accessed by clients who are billed a predetermined amount, for example, a monthly charge, or a charge that is based on volume of usage. Furthermore, the media content providers 204 may either provide open access to the public, or may require user authentication. As will be appreciated, for those media content providers that require user authentication, no content or services will be provided to a media device 202 that does not provide the proper authentication.

The network 210 represents any network that is compatible with the media devices 202 or the media content providers 204 and may include, by way of example, satellite networks, 802.11 networks, personal computer networks (e.g., LAN, WAN), wireless networks (e.g., Bluetooth, WiFi), cellular networks, telephony networks (e.g., landline or PSTN), data networks, the Internet, and the like or any combination thereof.

The service center 212 receives one or more data streams 208 from one or more of the media devices 202, and likewise receives one or more data streams 216 from one or more of the media content providers 204. Exemplary data streams 208 and 216 may be communicated over various types of networks such as, by way of example, wired and wireless computer networks including LAN, WAN, Internet, WiFi, WiMax, EVDO, Edge Networks, GPRS, and the like. The data streams 208 and 216 may include satellite signals, terrestrial signals, and the like or any other reasonable data stream communicated over any reasonable network protocol such as, by way of example, TCP or UDP or other Internet Protocol.

Although illustrated as a single entity, the service center 212 can be implemented in a distributed computing environment where tasks are performed by local and remote processing devices that are linked (either by hardwired links, wireless links, or by a combination of hardwired and wireless links) through a communications network. Additionally, the service center may store information to authenticate the media devices 202 so that the media devices may receive one or more services from the media content providers as will be described in more detail to follow.

Figure 3:
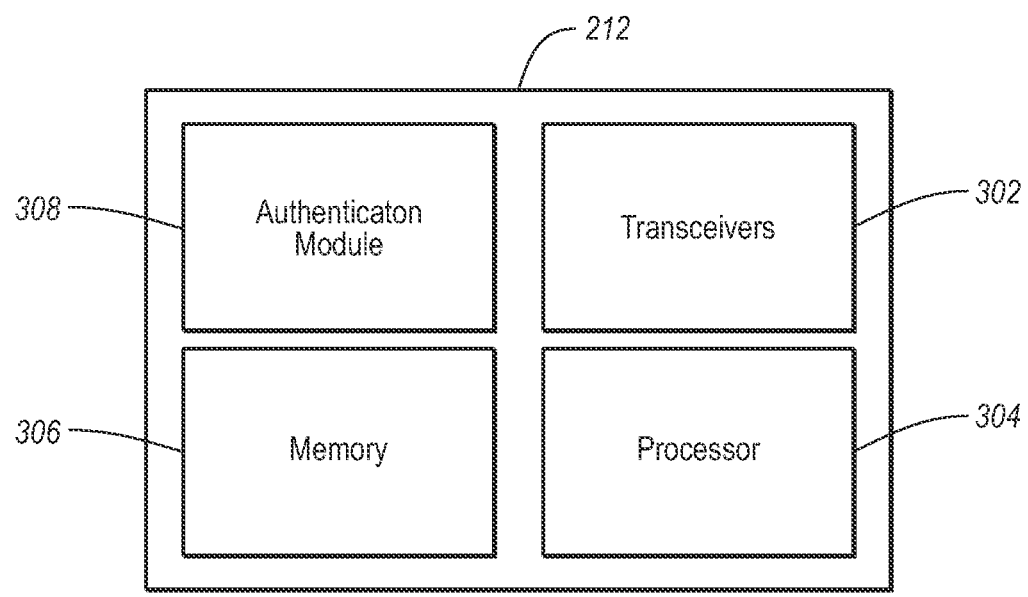
FIG. 3 illustrates a schematic drawing of an embodiment of the service center of FIG. 2.

Referring now to FIG. 3, a more detailed depiction is provided of the service center 212. The service center 212 may include one or more transceivers 302 for transferring data between itself and one or more portable media devices and also between itself and one or more media content providers. The transceivers 302 may include both wired and wireless transceivers for communicating with any of the network 210, media devices 202 and media content providers 204. The service center 212 may further include one or more memory modules 306 for storing data received from the media devices 202 and from the media content providers 204. For instance, the memory 306 may include one or more mapping tables including information about media devices 202 and/or media content providers 204, such as the data required to authenticate a media device 202. The interface service 212 may also include a processor 304 configured to provide general purpose processing for the various modules of the service center as circumstances warrant.

As further illustrated, in some embodiments service center 212 may also include an authentication module 308. Authentication module 308 may be configured to ensure that one or more of the media devices are properly authenticated such that the media devices 202 may be able to receive content or services from the media providers 204. For example, authentication module 308 may communicate with the media providers 204 to determine what information is needed for authentication. This information may then be provided to the media devices 202 upon request as will be described in more detail to follow. The authentication module 308 may be comprised of software, hardware, or any combination of software and hardware as circumstances warrant.

In some embodiments, the service center 212 may include one or more modules that provide additional functionality. Further details regarding these additional modules and their functionality may be found in commonly owned, co-pending U.S. patent application Ser. No. 12/259,471, filed Oct. 28, 2008, herein incorporated by reference in its entirety.

Reference is now made again to FIG. 2, which also illustrates a process flow of an embodiment for the service center to provide authentication for one or more media devices. As illustrated by communication line 410, service center 212 may communicate with media content providers 204a, 204b, and 204c. Note that the communication may occur the entire time the media content providers and the service center are connected to the network or the communication may occur only during a portion of the time the media content providers and the service center are connected to the network.

During this communication the authentication module 308 may receive or otherwise determine authentication information that a particular media content provider 204 requires before a media device is allowed to access content or services from the media content provider. For example, the authentication information may include, but is not limited to, user identification information, device configuration information, prior payment information, and the like or any combination thereof. For instance, some media content providers 204 may only be able to communicate using certain types of data formats. Alternatively, some of the media content providers may be pay sites that require proof of payment or the media content providers may require that a user's addresses or home phone number be provided prior to access being granted. It will be appreciated that the authentication information may include other information as circumstances warrant. Thus, the authentication information includes any information that a media content provider desires before it will grant permission to a media device 202 to be able to communicate with and receive content or services from the media content providers 204.

In some embodiments, some media content providers 204 may have a preexisting relationship with service center 212 and thus may have authentication information already stored in memory 306, for example in a mapping table. When a media content provider 204 does not have a preexisting relationship with the service center 212, the service center 212 may perform an initialization routine upon connection to the media content provider 204 to determine the authentication information, which may then be stored in the memory 306.

During operation, a user of media device 202a may desire to access or receive content or services from a particular media content provider, such as media content provider 204a. For example, the media content provider 204a may be an internet radio provider and the desired content or services may be music that is part of a user's playlist or the like. Accordingly, the user of media device 202a may request access to the desired content or service.

The request for the content or service from media device 202a is sent to and received by the service center 212 as illustrated by communication line 412. That is, the request for the content or service is directed to the service center 212 rather than proceeding directly to media content provider 204a so that service center 212 may provide the required authentication as will be explained in more detail.

In response to the request, service center 212, specifically authentication module 308, may determine what authentication information media content provider 204a requires before it will grant permission to media device 202a. In some embodiments, this determination is made by accessing the mapping table in memory 306. Alternatively, the authentication information may be accessed directly from the media content provider.

Once authentication module 308 has determined what type of information is required for authentication, it may then proceed to generate an authentication token 450 based upon the required information. The authentication token 450 may be a data structure or the like that includes at least enough of the information needed for media device 202a to gain permission to access the content or services of media content provider 204a. The authentication token may also include the DNS address for the desired content or services. In addition, the authentication token 450 may include instructions that configure media device 202a to be able to communicate properly with media content provider 202a.

In some embodiments, the service center 212 may require that the user of media device 202a provide various information in order to generate the authentication token 450. For example, the user may need to provide identification information such as an address or the like. In addition, device configuration information may be required. If the media device 202a has a preexisting relationship with the service center 212, then this information may have been previously stored in memory 306 and may be accessed by the service center 212.

Authentication module 308 may then provide the authentication token 450 to media device 202a as illustrated by communication line 414. Upon receipt, the authentication token 450 may cause the media device 202a to change its configurations if this was specified in the token 450. As discussed previously, in some embodiments media device 202a may need configuration changes before it can communicate with media content provider 204a.

Media device 202a may then communicate as illustrated by communication line 416 directly with media content provider 204a. During this communication, media device 202a may provide the authentication token 450 to media content provider 204a. As previously described, authentication token 450 will include all of the information that is necessary for media device 202a to gain permission to access the content or services of media content provider 204a without the need for separate or additional authentication from the media content provider. As illustrated by communication line 418, the content or service may then be provided directly by media content provider 204a to media device 202a. For example, the media device 202a may receive the music content from the media content provider. The music content may then be played by media device 202a for the listening pleasure of a user of the media device 202a.

There may be circumstances that cause one or more of the media content providers 204 to update or change their authentication information from time to time. For example, the media content provider may add a new data field to the information or may change an existing data field. As will be appreciated, the updated or changed authentication information may render a previously authenticated media device unable to receive content or services from the content provider. Advantageously, embodiments of the present invention make the media device immune to such changes in authentication.

As discussed above, authentication module 308 communicates with the media service providers 204 and determines the required authentication information. Accordingly, the authentication module 308 may also determine any updates or changes to the authentication information when in communication with the media content providers 204. The new authentication information may be stored in the memory 306 in some embodiments.

The authentication module 308 may then generate a new authentication token 450 based on the updated or changed authentication information. The new authentication token 450 may be provided to a media device 202 such as media device 202a to ensure that the media device 202a retains the ability to be authenticated to the desired media content provider.

In some embodiments, the new authentication token 450 may be provided to media device 202a when service center 212 receives a new request from the media device. In such embodiments, the media device 202a may be configured to first communicate with service center 212 for authentication every time the media device desires to receive content or services from a particular media content provider. In other embodiments where the media device 202a retains authentication after initially communicating with service center 212, the service center 212 may automatically provide the new authentication token 450 to the media device 202a. In either case, the media device 202a is at least partially immune to any changes to authentication as the service center 212 performs all the requisite processing of changes to the authentication token 450. The media devices 202*a* simply receives the new token and is thus able to communicate with the desired media content provider.

As will be appreciated, it may be desirable for a media device 202 to be authenticated to more than one media content provider 204. Accordingly, the process described above may be repeated such that service is authenticated for more than one media content provider. For example, as previously discussed, media device 202*a* may have content or service authenticated for media provider 204*a*. Media device 202*a* may also be authenticated by service center 212 to receive content or services from media content provider 204*b* and/or 204*c* using the process described above. For example, in some embodiments an authentication token 450 may be generated for each media content provider 204 or for a grouping of media content providers and provided to the media device 202*a*. In other embodiments, a single authentication token 450 may be generated that provides the required information for authentication to all the media content providers 450. Thus, the principles of the present invention allow service center 212 to provide authentication tokens for multiple media content providers to media device 202*a*.

Likewise, the principles of the present invention allow service center 212 to provide authentication for one or more content providers to multiple media devices. For instance, service center 212 may provide an authentication token 450 for media content providers 204 to media device 202*a* as previously described. Service center 212 may also provide the same or a substantially similar authentication token 450 to media devices 202*b* and 202*c* in the manner described. Once the media devices 202*b* and 202*c* are authenticated to the one or more media content providers 204, these media devices may directly communicate with the media content providers and may then directly receive the content or services from the providers as discussed above.

Advantageously, the service center 212 acts as a single location where the media media devices 202 may become authenticated prior to receiving content or services from the media content providers 204. This removes the need for the media devices 202 to contact each media content provider 204 for authentication. In addition, service center 212 renders the media devices 202 immune to any changes to authentication as the service center 212 performs all the requisite processing of changes to the authentication information and provides this to the media devices 202.

Figure 4:
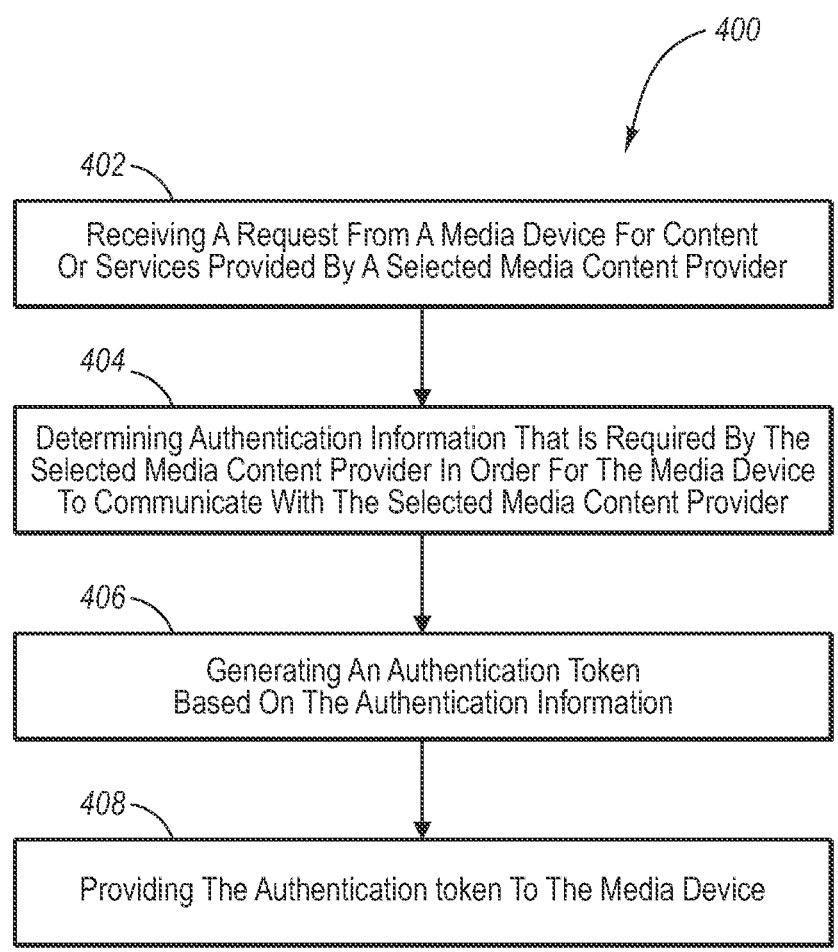
FIG. 4 illustrates a flow diagram for providing authentication to a media device so that the media device may receive content or services from the one or more media content providers.

Reference is now made to FIG. 4, which illustrates a method 400 for a system including a media device that receives content or services from one or more media content providers to provide authentication to the media device so that the media device may receive the content or services from the one or more media content providers. The method includes receiving 402 a request from a media device for content or services provided by a selected media content provider. For example, a user of media device 202*a* may desire to access or receive content or services from a particular media content provider, such as media content provider 204*a* and may thus make a request for this content. This request may be sent to service center 212. Note that this request for content will typically also select the media content provider.

The method 400 also includes determining 404 authentication information that is required by the selected media content provider in order for the media device to communicate with the selected media content provider. For example, the service center 212 may determine what types of information the media content provider 204*a* requires before permission will be granted to media device 202*a* to access content or services. As previously described, in some embodiments the determination may be made by accessing a mapping of information stored in memory 306. In other embodiments, the determination may be made by directly communicating with media content provider 204*a*.

The method 400 further includes generating 406 an authentication token based on the authentication information. For instance, service center 212 may generate an authentication token 450 based on the authentication information. The authentication token 450 may include, but is not limited to, user information, device configuration information, payment information, address information, duration for which the authentication token is valid, and any other information needed so that media device 202*a* may be authenticated for content or service from media content provider 204*a*.

The method 400 also includes providing 408 the authentication token to the media device. For example the authentication token 450 may be provided by service center 212 to media device 202*a*. As previously discussed, the authentication token 450 is configured to allow the media device 202*a* to receive the content or services directly from the media provider 204*a* without the need for additional authentication from the media content provider 204*a*. In other words, all of the authentication processing steps are performed at the service center 212 and no further authentication processing steps need be performed by the media device 202*a* or the media content provider 204*a*.

In some embodiments, the service center 212 may perform the method 400 for more than one media device. For example, the service center 212 may generate and provide authentication tokens 450 to media devices 202*b* and 202*c*. Further, in some embodiments the service center 212 may determine when changes or updates are made to authentication information and may then generate a new authentication token or may update the existing authentication token. Advantageously, this at least partially renders the media device immune to changes in authentication as the service center 212 ensures that the media device is always properly authenticated.

Figure 5:
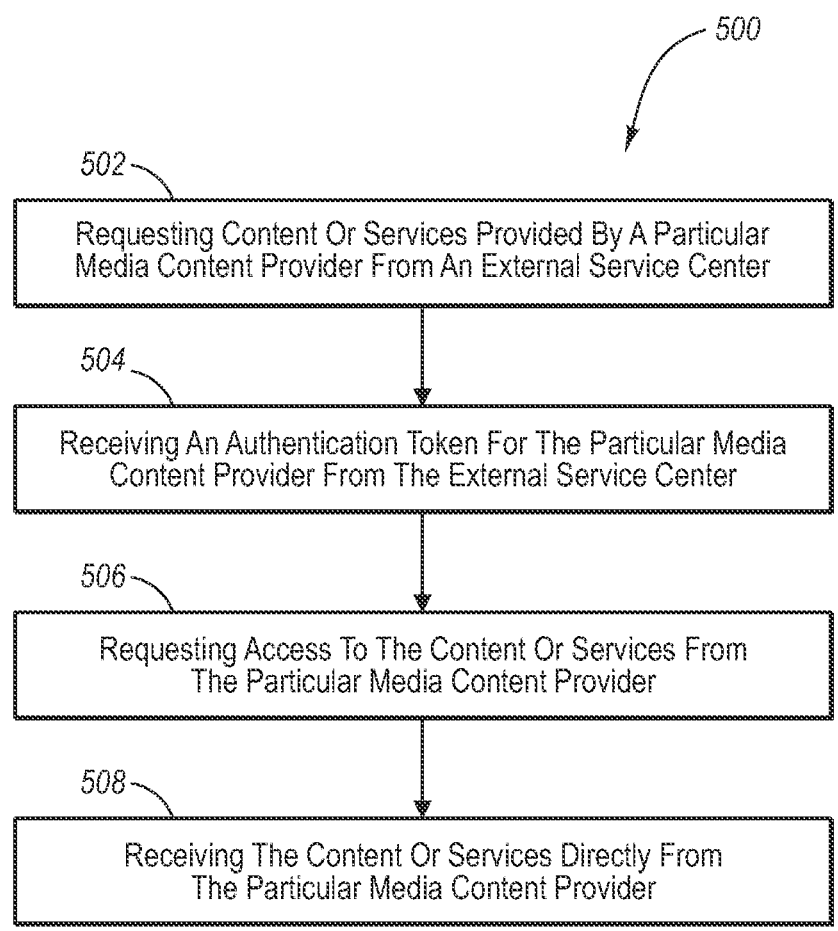
FIG. 5 illustrates another flow diagram for providing authentication to a media device so that the media device may receive content or services from the one or more media content providers.

Turning now to FIG. 5, a method 500 for a system including a media device that receives content or services from one or more media content providers to receive authentication for access to the content or services from the one or more media content providers is illustrated. The method includes requesting 502 content or services provided by a particular media content provider from an external service center. For example, a user of media device 202*a* may desire to access or receive content or services from a particular media content provider, such as media content provider 204*a* and may thus make a request for the content or services. This request may be sent to service center 212.

The method 500 also includes receiving 504 an authentication token for the particular media content provider from the external service center. For example, in response to the request the service center 212 may generate and provide authentication token 450 to media device 202*a*. As mentioned above, the authentication token 450 authenticating access to the content or services provided by the particular media content provider such as media content provider 404*a* without the need for additional authentication from the particular media content provider. Thus, the authentication token 450 includes all the information necessary to authenticate the media device 202*a* for content or services from media content provider 204*a* without the need for additional authentication from the media content provider.

The method 500 further includes requesting 506 access to the content or services from the particular media content provider. For example, once it has received the authentication token 450, the media device 202*a* may request access to the content or services directly from media content provider 204*a*. In some embodiments, this request includes providing the authentication token 450 to the media content provider 204*a*.

The method 500 additionally includes receiving 508 the content or services directly from the particular media content provider. For example, the media device 202*a* may receive the content or services directly from media content provider 240*a*. Thus, although the service center 212 provides the authentication token and performs the processing necessary to authenticate media device 202*a*, the actual content is received directly from the media content provider 204*a*.

In some embodiments, the media device 202*a* may request content or services from additional media content providers such as media content providers 204*b* and 204*c*. In response to these requests, the media device 202*a* may receive additional authentication tokens 450 from the service center 212. The media device 202*a* may then request access to the content or services of media content providers 204*b* and 204*c* by providing these authentication tokens to the media content providers. The media device may then receive the content or services directly from the media content providers 204*b* and 204*c*.

Embodiments herein may comprise a special purpose or general-purpose computer including various computer hardware. Portable media devices are examples of special purpose computers. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system including a media device that receives content or services from one or more media content providers, a method performed by a service center for providing authentication information to the media device so that the media device may receive the content or services from the one or more media content without first communicating with the one or more media content providers, the method comprising:

receiving, at a service center, a request from a media device, the request requesting access to media content or services provided by a selected media content provider, the selected media content provider being a separate entity from the service center, the request from the media device being sent from the media device to the service center before the media device has communicated any request to the selected media content provider;

determining, by the service center, authentication information that is required by the selected media content provider in order for the media device to receive media content from the selected media content provider;

generating an authentication token that includes authentication information for allowing the media device to authenticate to the selected media content provider without having communicated previously any request to the selected media content provider; and providing the authentication token to the media device, wherein the authentication token is configured to allow the media device to authenticate directly to the selected media content provider, without having previously communicated any request to the selected media content provider and without further communication with the service center and by sending the authentication token to the selected media content provider, to authenticate the media device to receive media content or services directly from the selected media content provider.

2. The method in accordance with claim 1, wherein determining the authentication information required by the selected media content provider comprises accessing information stored at the service center.

3. The method in accordance with claim 1, wherein determining the authentication information required by the selected media content provider comprises querying the selected media content provider for the required authentication information.

4. The method in accordance with claim 1, wherein the selected media content provider is a first media content provider and the request is a first request, the method further comprising:

receiving a second request from the media device, the request requesting access to media content provided by a second selected media content provider;

determining authentication information that is required by the second selected media content provider in order for the media device to receive media content from the second selected media content provider;

generating a second authentication token based on the authentication information that includes authentication information for authenticating the media device to the second selected media content provider; and providing the second authentication token to the media device, wherein the second authentication token is configured to allow the media device to authenticate directly to the second selected media content provider, without further communication with the service center, to authenticate the media device to receive media content directly from the second selected media provider.

5. The method in accordance with claim 1, further comprising:
   determining that the authentication information required by the selected media content provider has been changed;
   generating a second authentication token that includes the changed authentication information for authenticating the media device to the selected media content provider; and
   providing the second authentication token to the media device, wherein the second authentication token in configured to allow the media device to continue to authenticate directly to the selected media content provider, without further communication with the service center, to authenticate the media device to receive media content from the selected media provider.

6. The method in accordance with claim 5, wherein the second authentication token is provided to the media device upon receipt of a second request for media content from the media device.

7. The method in accordance with claim 5, wherein the second authentication token is provided to the media device automatically upon the generation of the second authentication token.

8. The method in accordance with claim 1, wherein the media device is a first media device, the method further comprising:
   receiving, at the service center, a request from a second media device, the request requesting access to media content provided by the selected media content provider; and
   providing a second authentication token to the second media device, wherein the second authentication token is configured to allow the second media device to authenticate directly to the selected media content provider, without further communication with the service center, to authenticate the second media device to receive media content directly from the selected media provider.

9. The method in accordance with claim 1, wherein generating an authentication token further comprises:
   receiving additional information necessary to generate the authentication token from the media device.

10. The method in accordance with claim 1, wherein the authentication token includes at least one of user information, device configuration information, payment information, duration for which the authentication token is valid, or address information.

11. A method for a media device to receive an authentication token from a service center that includes the required authentication information for authenticating the media device to access media content from a media content provider without first communicating with the media content provider, the method comprising:
   requesting, by the media device and prior to communicating with a media content provider, an authentication token from a service center, the authentication token including authentication information for authenticating the media device to a media content provider to enable the media device to receive media content from the media content provider without communicating previously any request to the media content provider prior to receiving the authentication token, the media content provider being a separate entity from the service center;
   receiving, by the media device, the authentication token from the service center, the authentication token being generated by the service center and containing the authentication information required by the media content provider to authenticate the media device to receive media content from the media content provider without having previously communicated any request to the media content provider prior to receiving the authentication token;
   requesting, by the media device, access to media content from the media content provider, the request being sent directly to the media content provider without communicating with the service center, the request including the authentication token; and
   receiving, by the media device, media content from the media content provider upon being authenticated by the media content provider based on the authentication information contained in the authentication token.

12. The method in accordance with claim 11, wherein the media content provider is a first media content provider and the authentication token is a first authentication token, the method further comprising:
   requesting, by the media device, a second authentication token from the service center, the second authentication token including authentication information for authenticating the media device to a second media content provider to enable the media device to receive media content from the second media content provider, the second media content provider being a separate entity from the service center and the first media content provider;
   receiving, by the media device, the second authentication token from the service center, the second authentication token being generated by the service center and containing the authentication information required by the second media content provider to authenticate the media device to receive media content from the second media content provider;
   requesting, by the media device, access to media content from the second media content provider, the request being sent directly to the second media content provider without communicating with the service center, the request including the second authentication token; and
   receiving, by the media device, media content from the second media content provider upon being authenticated by the second media content provider based on the authentication information contained in the second authentication token.

13. The method in accordance with claim 11, further comprising:
   receiving a second authentication token from the external service center, the second authentication token containing updated authentication information required by the media content provider, the second authentication token being received:
      automatically in response to the service center detecting that the media content provider has changed the authentication information required to authenticate the media device; or
      in response to the media device requesting access to media content from the media content provider.

14. The method in accordance with claim 11, wherein the media device, the service center, and the media content provider are connected via a wired or wireless network, wherein the wireless network is one or more of an 802.11 network, a terrestrial network, a cellular network, or a satellite network.

15. The method in accordance with claim 11, wherein the media device is one of a satellite radio device, a portable audio player, a portable DVD or CD player, a personal computer, a laptop computer, a server computer, a cellular telephone, a personal digital assistant (PDA), or any combination thereof.

16. A service center for generating an authentication token containing authentication information for authenticating a media device to a media content provider without the media device first communicating with the media content providers, the service center comprising:
   a processor;
   one or more transceivers for transferring data between the service center and the media device and between the service center and the media content providers;
   one or more computer storage media for storing authentication information required by the media content provider to authenticate the media device to receive media content from the media content providers; and
   an authentication module configured to:
      receive a request from the media device, the request requesting access to media content provided by the media content provider, the request from the media device being sent from the media device to the service center before the media device has communicated any request to the selected media content provider;
      access the stored authentication information that is required by the media content provider in order for the media device to receive media content from the media content provider;
      generate an authentication token that includes authentication information for allowing the media device to authenticate to the media content provider without having communicated previously any request to the selected media content provider; and
      providing the authentication token to the media device, wherein the authentication token is configured to allow the media device to authenticate directly to the media content provider, without having previously communicated any request to the selected media content provider and without further communication with the service center and by sending the authentication token to the selected media content provider, to authenticate the media device to receive media content directly from the media content provider.

17. The service center in accordance with claim 16, wherein the authentication module is further configured to generate and provide to the media device an updated authentication token in response to a change in the authentication information required by the media content provider.

18. A media device comprising:
   a processor;
   a display;
   an interface for receiving and transmitting digital media;
   one or more computer storage media for storing information; and
   a user interface;
   the media device configured to:
      request, prior to communicating with a media content provider, an authentication token from a service center, the authentication token including authentication information for authenticating the media device to the media content provider to enable the media device to receive media content from the media content provider without communicating previously any request to the media content provider prior to receiving the authentication token, the media content provider being a separate entity from the service center;
      receive the authentication token from the service center, the authentication token being generated by the service center and containing the authentication information required by the media content provider to authenticate the media device to receive media content from the media content provider without having previously communicated any request to the media content provider prior to receiving the authentication token;
      request access to media content from the media content provider, the request being sent directly to the media content provider without communicating with the service center, the request including the authentication token; and
      receive media content from the media content provider upon being authenticated by the media content provider based on the authentication information contained in the authentication token.

* * * * *